(12) United States Patent
Choe et al.

(10) Patent No.: US 12,351,713 B2
(45) Date of Patent: Jul. 8, 2025

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Junho Choe, Daejeon (KR); Seong Lyong Kim, Daejeon (KR); Dae San Jung, Daejeon (KR); Ho Namgung, Daejeon (KR); Seokhee Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 579 days.

(21) Appl. No.: 17/773,395

(22) PCT Filed: Jul. 6, 2021

(86) PCT No.: PCT/KR2021/008533
§ 371 (c)(1),
(2) Date: Apr. 29, 2022

(87) PCT Pub. No.: WO2022/065640
PCT Pub. Date: Mar. 31, 2022

(65) Prior Publication Data
US 2022/0380593 A1  Dec. 1, 2022

(30) Foreign Application Priority Data

Sep. 24, 2020 (KR) .................. 10-2020-0124006
Jul. 1, 2021 (KR) .................. 10-2021-0086462

(51) Int. Cl.
| | |
|---|---|
| C08L 55/02 | (2006.01) |
| B29C 48/00 | (2019.01) |
| C08F 212/08 | (2006.01) |
| C08F 220/44 | (2006.01) |
| C08F 222/40 | (2006.01) |
| C08J 3/12 | (2006.01) |
| C08L 23/06 | (2006.01) |
| C08L 25/12 | (2006.01) |
| C08L 51/00 | (2006.01) |

(52) U.S. Cl.
CPC .......... *C08L 55/02* (2013.01); *B29C 48/0017* (2019.02); *B29C 48/022* (2019.02); *C08F 212/08* (2013.01); *C08F 220/44* (2013.01); *C08F 222/40* (2013.01); *C08J 3/12* (2013.01); *C08L 23/06* (2013.01); *C08L 25/12* (2013.01); *C08L 51/003* (2013.01); *C08L 2203/30* (2013.01); *C08L 2205/025* (2013.01); *C08L 2205/035* (2013.01); *C08L 2207/062* (2013.01)

(58) Field of Classification Search
CPC .... C08L 55/02; C08L 23/06; C08L 2205/035; C08L 2207/062; C08F 212/08; C08F 220/44
See application file for complete search history.

(56) References Cited

U.S. PATENT DOCUMENTS

| | | | |
|---|---|---|---|
| 6,114,442 | A | 9/2000 | Jung |
| 2004/0054077 | A1 | 3/2004 | Chung et al. |
| 2017/0292017 | A1 | 10/2017 | Jung et al. |
| 2018/0086906 | A1 | 3/2018 | Eim et al. |
| 2018/0187007 | A1* | 7/2018 | Kim ................. C08L 69/00 |
| 2019/0194445 | A1* | 6/2019 | Shin ................. C08L 23/08 |

FOREIGN PATENT DOCUMENTS

| | | | |
|---|---|---|---|
| CN | 107880426 A | 4/2018 | |
| CN | 109988373 A | 7/2019 | |
| EP | 3858915 A1 * | 8/2021 | ............ C08F 279/04 |
| JP | H06-299044 A | 10/1994 | |
| JP | H09316263 A | 12/1997 | |
| JP | 2001-214026 A | 8/2001 | |
| JP | 2001279049 A | 10/2001 | |
| JP | 2002-201329 A | 7/2002 | |
| JP | 2016069599 A * | 5/2016 | |
| JP | 2016-138197 A | 8/2016 | |
| JP | 2019137733 A | 8/2019 | |
| KR | 10-0491031 B1 | 5/2005 | |
| KR | 10-2009-0020851 A | 2/2009 | |
| KR | 10-0887316 B1 | 3/2009 | |
| KR | 10-1072120 B1 | 10/2011 | |
| KR | 10-2013-0075793 A | 7/2013 | |
| KR | 10-1322102 A | 10/2013 | |
| KR | 10-2016-0127397 A | 11/2016 | |
| KR | 10-1791736 B1 | 10/2017 | |
| KR | 10-2019-0082148 A | 7/2019 | |
| KR | 10-2049869 B1 | 11/2019 | |
| KR | 10-2073762 B1 | 2/2020 | |
| KR | 10-2020-0036594 A | 4/2020 | |
| WO | WO-2020067681 A1 * | 4/2020 | ............ C08F 279/04 |

OTHER PUBLICATIONS

Machine translation of JP2016069599A obtained from the European Patent Office website in Nov. 2024 (Year: 2016).*

(Continued)

*Primary Examiner* — Arrie L Reuther
*Assistant Examiner* — Devin Mitchell Darling
(74) *Attorney, Agent, or Firm* — Morgan, Lewis & Bockius LLP

(57) ABSTRACT

Disclosed is a thermoplastic resin composition, a method of preparing the same, and a molded article manufactured using the same, including a thermoplastic resin composition including 100 parts by weight of a base resin including a vinyl cyanide compound-conjugated diene compound-aromatic vinyl compound graft copolymer (A); a vinyl cyanide compound-conjugated diene compound-aromatic vinyl compound copolymer (B); an acrylate-aromatic vinyl compound-vinyl cyanide compound graft copolymer (C); a vinyl cyanide compound-aromatic vinyl compound copolymer (D); and a branched vinyl cyanide compound-aromatic vinyl compound copolymer (E) and a high-density polyethylene resin (F), a method of preparing the thermoplastic resin composition, and a molded article manufactured using the thermoplastic resin composition.

13 Claims, No Drawings

(56) References Cited

OTHER PUBLICATIONS

Extended European Search Report dated Oct. 11, 2022 for related European Patent Application No. 21 86 3090, 5 pages.
International Search Report and Written Opinion issued in corresponding International Patent Application No. PCT/KR2021/008533 dated Oct. 8, 2021.

* cited by examiner

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

The present application is a U.S. National Stage of PCT/KR2021/008533, filed on Jul. 6, 2021, which claims priority to Korean Patent Application No. 10-2020-0124006, filed on Sep. 24, 2020, and Korean Patent Application No. 10-2021-0086462, re-filed on Jul. 1, 2021, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same, and more particularly, to a thermoplastic resin composition having excellent blow moldability and a wide range of molding temperatures, a method of preparing the thermoplastic resin composition, and a molded article manufactured using the thermoplastic resin composition.

BACKGROUND ART

A conventional blow-molded acrylonitrile-butadiene-styrene (hereinafter referred to as "ABS") resin composition for automobiles includes a styrene-based copolymer having a weight average molecular weight of 20,000 g/mol or more and a phenylmaleimide-based copolymer to secure blow processability and heat resistance.

In the case of blow-molded ABS resin compositions for automobiles having a high molecular weight, a complex chain structure, and high polarity, it is difficult to control the heat of reaction during polymerization, resulting in lower productivity. In addition, due to high molecular weight thereof, during blow molding, melt-fracture may easily be induced on the surface of a product. To prevent these problems, an excess of a lubricant and an excess of a release agent must be added.

On the other hand, in the case of blow-molded ABS resin compositions having a low molecular weight, parison sag tends to occur during blow molding. To solve this problem, a heat-resistant resin having a high glass transition temperature is included to improve heat resistance and viscosity. In this case, it is difficult to set molding temperature for each product weight because processability deviation according to temperature is large. In addition, there is a trade-off relationship between plasticization of the heat-resistant resin and the fluidity of the low molecular weight resin, so setting of molding temperature is limited. Since temperature maintenance capacity for blow equipment and product weight specifications are different, resin compositions for blow molding should have a wide range of molding temperatures.

Therefore, there is a need to develop a resin composition for blow molding having excellent blow moldability and a wide range of molding temperatures.

RELATED ART DOCUMENTS

Patent Documents

KR 10-0491031 B1

DISCLOSURE

Technical Problem

Therefore, the present invention has been made in view of the above problems, and it is one object of the present invention to provide a thermoplastic resin composition having excellent blow moldability and a wide range of molding temperatures, a method of preparing the thermoplastic resin composition, and a molded article manufactured using the thermoplastic resin composition.

The above and other objects can be accomplished by the present invention described below.

Technical Solution

In accordance with one aspect of the present invention, provided is a thermoplastic resin composition including 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a thermoplastic resin composition including 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; and 5 to 25% by weight of an aromatic vinyl compound-maleimide compound copolymer (G) and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a thermoplastic resin composition including 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; and 5 to 30% by weight of an α-methyl styrene-based compound-vinyl cyanide compound copolymer (H) and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a thermoplastic resin composition including 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; 5 to 25% by weight of an aromatic vinyl compound-maleimide compound copolymer (G); and 5 to 30% by weight of an α-methyl styrene-based compound-vinyl cyanide compound copolymer (H) and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a thermoplastic resin composition including 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm$^3$ and a weight average molecular weight of 1,000 to 6,500 g/mol, wherein the thermoplastic resin composition has a parison sag of 40 seconds or more, measured as time taken to extend a parison having a length of 500 mm, a thickness of 0.5 mm, and a weight of 500 g by 1% or more based on an entire length of the parison while discharging the parison from a blow molding machine at a barrel temperature of 220° C.

In accordance with another aspect of the present invention, provided is a method of preparing a thermoplastic resin composition, the method including preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a method of preparing a thermoplastic resin composition, the method including preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; and 5 to 25% by weight of an aromatic vinyl compound-maleimide compound copolymer (G) and 0.1 to 2.5 parts by weight of a high-density polyethylene resin (F) having a density of 0.9 to 1.5 g/cm$^3$ and a weight average molecular weight of 1,000 to 6,500 g/mol.

In addition, the present invention provides a method of preparing a thermoplastic resin composition, the method including preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; and 5 to 30% by weight of an α-methyl styrene-based compound-vinyl cyanide compound copolymer (H) and 0.1 to 2.5 parts by weight of a high-density polyethylene resin (F) having a density of 0.9 to 1.5 g/cm³ and a weight average molecular weight of 1,000 to 6,500 g/mol.

In addition, the present invention provides a method of preparing a thermoplastic resin composition, the method including preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; 1 to 20% by weight of a branched vinyl cyanide compound-aromatic vinyl compound copolymer (E) having a weight average molecular weight of 300,000 to 800,000 g/mol; 5 to 25% by weight of an aromatic vinyl compound-maleimide compound copolymer (G); and 5 to 30% by weight of an α-methyl styrene-based compound-vinyl cyanide compound copolymer (H) and 0.1 to 2.5 parts by weight of a high-density polyethylene resin (F) having a density of 0.9 to 1.5 g/cm³ and a weight average molecular weight of 1,000 to 6,500 g/mol.

In addition, the present invention provides a method of preparing a thermoplastic resin composition, the method including preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm³ and a weight average molecular weight of 1,000 to 6,500 g/mol, wherein the prepared thermoplastic resin composition has a parison sag of 40 seconds or more, measured as time taken to extend a parison having a length of 500 mm, a thickness of 0.5 mm, and a weight of 500 g by 1% or more based on an entire length of the parison while discharging the parison from a blow molding machine at a barrel temperature of 220° C.

In accordance with yet another aspect of the present invention, provided is a molded article including the thermoplastic resin composition.

Advantageous Effects

The present invention has an effect of providing a thermoplastic resin composition, a method of preparing the same, and a molded article manufactured using the same. The thermoplastic resin composition of the present invention has excellent blow moldability and is capable of being molded at a wide range of temperatures due to excellent productivity even when a resin having low molecular weight is used in combination with a heat-resistant resin having a high glass transition temperature.

BEST MODE

Hereinafter, a thermoplastic resin composition, a method of preparing the same, and a molded article manufactured using the same according to the present invention will be described in detail.

The present inventors confirmed that, when an acrylate-aromatic vinyl compound-vinyl cyanide compound graft copolymer having a predetermined graft ratio and a predetermined weight average molecular weight, a vinyl cyanide compound-aromatic vinyl compound copolymer having a predetermined weight average molecular weight, a branched vinyl cyanide compound-aromatic vinyl compound copolymer having a predetermined weight average molecular weight, and a high-density polyethylene resin having a predetermined density and a predetermined weight average molecular weight were added to an ABS graft copolymer and an ABS non-graft copolymer in a predetermined content ratio, blow moldability was excellent, and molding was possible at a wide range of temperatures. Based on these results, the present inventors conducted further studies to complete the present invention.

The thermoplastic resin composition of the present invention includes 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm³ and a weight average molecular weight of 1,000 to 6,500 g/mol. In this case, the thermoplastic resin composition may have excellent blow moldability and a wide range of molding temperatures.

Hereinafter, each component of the thermoplastic resin composition of the present invention will be described in detail.

(A) Vinyl Cyanide Compound-Conjugated Diene Compound-Aromatic Vinyl Compound Graft Copolymer For example, based on a total weight of the base resin, the vinyl cyanide compound-conjugated diene compound-aromatic vinyl compound graft copolymer (A) may be included in an amount of 10 to 50% by weight, preferably 15 to 45% by weight, more preferably 20 to 42% by weight, still more preferably 20 to 35% by weight, most preferably 20 to 30% by weight. Within this range, impact strength and impact strength at low temperature may be excellent, and rigidity may be excellent.

For example, the vinyl cyanide compound-conjugated diene compound-aromatic vinyl compound graft copolymer (A) may be a graft copolymer prepared by graft-polymerizing 1 to 25% by weight of a vinyl cyanide compound, 45 to 75% by weight of conjugated diene rubber including a conjugated diene compound, and 15 to 45% by weight of an aromatic vinyl compound. Within this range, impact strength and impact strength at low temperature may be excellent, and rigidity may be excellent.

As a preferred example, the vinyl cyanide compound-conjugated diene compound-aromatic vinyl compound graft copolymer (A) may be a graft copolymer prepared by graft-polymerizing 1 to 20% by weight of a vinyl cyanide compound, 50 to 70% by weight of conjugated diene rubber including a conjugated diene compound, and 20 to 40% by weight of an aromatic vinyl compound. Within this range, impact strength and impact strength at low temperature may be excellent, and rigidity may be excellent.

As a more preferred example, the vinyl cyanide compound-conjugated diene compound-aromatic vinyl compound graft copolymer (A) may be a graft copolymer prepared by graft-polymerizing 5 to 15% by weight of a vinyl cyanide compound, 55 to 65% by weight of conjugated diene rubber including a conjugated diene compound, and 25 to 35% by weight of an aromatic vinyl compound. Within this range, impact strength and impact strength at low temperature may be excellent, and rigidity may be excellent.

In this description, a polymer including a certain compound means a polymer prepared by polymerizing the compound, and a unit in the polymer is derived from the compound.

For example, in the graft copolymer (A), the conjugated diene rubber may have an average particle diameter of 150 to 450 nm, preferably 200 to 400 nm, more preferably 250 to 350 nm. Within this range, mechanical properties such as impact strength may be excellent.

In this specification, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

For example, the graft copolymer (A) may have a graft ratio of 32 to 50%, preferably 35 to 45% Within this range, since the melt index of a thermoplastic resin composition is properly maintained, blow moldability may be excellent.

In this description, a certain amount of a graft copolymer is immersed in acetone, dissolved using a vibrator, centrifuged using a centrifuge, and dried to obtain insoluble matter. Then, graft ratio may be calculated using Equation 1 below.

Specifically, a certain amount of a graft copolymer is immersed in acetone, vibrated with a vibrator (trade name: SI-600R, manufacturer: Lab Companion) for 24 hours to dissolve the isolated graft copolymer, centrifuged at 14,000 rpm for 1 hour using a centrifuge, and dried at 140° C. for 2 hours using a vacuum dryer (trade name: DRV320DB, manufacturer: ADVANTEC) to obtain insoluble matter. Then, graft ratio is calculated by Equation 1 below.

$$\text{Graft ratio (\%)} = [(Y-(X \times R))/(X \times R)] \times 100 \quad \text{[Equation 1]}$$

Y: Weight of insoluble matter
X: Weight of graft copolymer added when obtaining insoluble matter
R: Fraction of conjugated diene-based polymer in graft copolymer added when obtaining insoluble matter For example, the graft copolymer (A) may have a weight average molecular weight of 50,000 to 200,000 g/mol, preferably 60,000 to 150,000 g/mol, more preferably 70,000 to 100,000 g/mol. Within this range, mechanical properties may be excellent.

In this description, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specifically, the weight average molecular weight is a weight average molecular weight (Mw) converted based on polystyrene by gel permeation chromatography (GPC, PL GPC220, Agilent Technologies). More specifically, weight average molecular weight is measured through gel permeation chromatography (GPC, Waters 2410 RI detector, 515 HPLC pump, 717 auto sampler). 0.02 g of each polymer is dissolved in 20 ml of tetrahydrofuran (THF), filtered using a 0.45 μm filter, and placed in a GPC vial (4 ml) to prepare each sample. From 1 hour before start of measurement, the solvent (THF) is injected at a rate of 1.0 mL/min, and measurement is performed under conditions of a measurement time of 25 minutes, an injection volume of 150 μL, a flow rate of 1.0 ml/min, an isocratic pump mode, and an RI detector of 40. At this time, calibration may be performed using a polystyrene standard (PS), and data processing may be performed using ChemStation.

In this description, for example, the conjugated diene compound may include one or more selected from the group consisting of 1,3-butadiene, 2,3-dimethyl-1,3-butadiene, 2-ethyl-1,3-butadiene, 1,3-pentadiene, isoprene, chloroprene, and piperylene, preferably 1,3-butadiene.

In this description, for example, the vinyl cyanide compound may include one or more selected from the group consisting of acrylonitrile, methacrylonitrile, ethylacrylonitrile, and isopropylacrylonitrile, preferably acrylonitrile.

In this description, for example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromo styrene, ρ-chloro styrene, m-bromo styrene, o-chlorostyrene, ρ-chloro styrene, m-chlorostyrene, vinyltoluene, vinylxylene, fluorostyrene, and vinylnaphthalene, preferably styrene.

For example, the graft copolymer (A) may be prepared by a known polymerization method such as emulsion polymerization, suspension polymerization, or bulk polymerization, preferably emulsion polymerization.

For example, when the graft copolymer (A) is prepared by emulsion graft polymerization, a mixture containing 1 to 25% by weight of a vinyl cyanide compound and 15 to 45% by weight of an aromatic vinyl compound may be added to a mixed solution containing 45 to 75% by weight of conjugated diene rubber, 0.1 to 5 parts by weight of an emulsifier, 0.1 to 3 parts by weight of a molecular weight modifier, and 0.05 to 1 part by weight of a polymerization initiator continuously or batchwise.

Here, "% by weight" is based on 100% by weight in total of the conjugated diene rubber, the vinyl cyanide compound, and the aromatic vinyl compound, and "parts by weight" are based on 100 parts by weight in total of the conjugated diene rubber, the vinyl cyanide compound, and the aromatic vinyl compound.

For example, the emulsifier may include one or more selected from the group consisting of allyl aryl sulfonates, alkali methyl alkyl sulfonates, sulfonated alkyl esters, fatty acid soap, and rosin acid alkali salts. In this case, polymerization stability may be excellent.

For example, the molecular weight modifier may include one or more selected from the group consisting of t-dodecyl mercaptan, n-dodecyl mercaptan, n-octyl mercaptan, and carbon tetrachloride, preferably t-dodecyl mercaptan.

For example, the polymerization initiator may include one or more selected from the group consisting of potassium persulfate, sodium persulfate, and ammonium persulfate. In this case, emulsion polymerization may be efficiently performed.

For example, latex prepared by graft emulsion polymerization may be coagulated using one or more coagulants selected from the group consisting of sulfuric acid, $MgSO_4$, $CaCl_2$, and $Al_2(SO_4)_3$, and then the coagulated latex may be dehydrated and dried to obtain powdered latex.

(B) Vinyl Cyanide Compound-Conjugated Diene Compound-Aromatic Vinyl Compound Copolymer For example, based on a total weight of the base resin, the vinyl cyanide compound-conjugated diene compound-aromatic vinyl compound copolymer (B) may be included in an amount of 10 to 55% by weight, preferably 20 to 50% by weight, more preferably 25 to 47% by weight, still more preferably 25 to 40% by weight, most preferably 25 to 35% by weight. Within this range, occurrence of parison sag may be prevented, blow moldability may excellent due to excellent rigidity, and a wide range of molding temperatures may be secured.

In this description, a parison refers to a tubular molten pre-molded article for molding of a container in direct blow molding. Specifically, a parison has a tube or pipe shape before sucking in air in blow molding, and refers to a pre-molded material (usually, thermoplastic resins) that is inserted into a blow molding die and inflated uniformly with intake air.

In this description, parison sag is a phenomenon in which a parison sags due to gravity in an extrusion process, and in this case, the thickness of a molded article changes.

The copolymer (B) of the present invention may be a bulk copolymer prepared by bulk-polymerizing conjugated diene rubber including a conjugated diene compound, a vinyl cyanide compound, and an aromatic vinyl compound, and may be referred to as a non-graft copolymer compared to the graft copolymer (A).

The copolymer (B) preferably includes 5 to 20% by weight of conjugated diene rubber including a conjugated diene compound, 55 to 85% by weight of an aromatic vinyl compound, and 5 to 25% by weight of a vinyl cyanide compound, more preferably 8 to 15% by weight of conjugated diene rubber including a conjugated diene compound, 65 to 78% by weight of an aromatic vinyl compound, and 13 to 22% by weight of a vinyl cyanide compound. Within this range, occurrence of parison sag may be prevented, and rigidity may be excellent.

For example, the conjugated diene rubber included in the copolymer (B) may have an average particle diameter of 1,000 to 2,000 nm, preferably 1,000 to 1,800 nm. Within this range, mechanical properties may be excellent.

(C) Acrylate-Aromatic Vinyl Compound-Vinyl Cyanide Compound Graft Copolymer Having Graft Ratio of 40 to 60% and Weight Average Molecular Weight of 150,000 to 200,000 g/mol For example, based on a total weight of the base resin, the graft copolymer (C) may be included in an amount of 4 to 11% by weight, preferably 4.5 to 10.5% by weight, more preferably 5 to 10% by weight. Within this range, occurrence of parison sag may be prevented, blow moldability may excellent due to excellent rigidity, and a wide range of molding temperatures may be secured.

The graft copolymer (C) preferably has a graft ratio of 40 to 55%. Within this range, blow moldability may be excellent, and a wide range of molding temperatures may be secured.

The graft copolymer (C) preferably has a weight average molecular weight of 160,000 to 190,000 g/mol. Within this range, blow moldability may be excellent, and a wide range of molding temperatures may be secured.

For example, the graft copolymer (C) may be an acrylate-aromatic vinyl compound-vinyl cyanide compound graft copolymer including acrylate-based rubber having an average particle diameter of 300 to 600 nm. In this case, mechanical properties, such as impact strength and tensile strength, and blow moldability may be excellent, and a wide range of molding temperatures may be secured.

For example, the graft copolymer (C) may be a copolymer including 20 to 60% by weight of acrylate-based rubber having an average particle diameter of 300 to 600 nm, 10 to 50% by weight of an aromatic vinyl compound, and 5 to 30% by weight of a vinyl cyanide compound. Within this range, mechanical properties, heat resistance, and blow moldability may be excellent, and a wide range of molding temperatures may be secured.

For example, the acrylate-based rubber included in the graft copolymer (C) may have an average particle diameter of 300 to 600 nm, preferably 300 to 500 nm, more preferably 350 to 450 nm. Within this range, mechanical properties such as impact strength and tensile strength may be excellent.

For example, based on a total weight of the graft copolymer (C), the acrylate-based rubber included in the graft copolymer (C) may be included in an amount of 20 to 60% by weight, preferably 30 to 55% by weight, more preferably 40 to 55% by weight. Within this range, mechanical properties such as impact strength and tensile strength may be excellent.

For example, the acrylate-based rubber may be prepared by emulsion-polymerizing an acrylate-based monomer. As a specific example, the acrylate-based rubber may be prepared by mixing an acrylate-based monomer, an emulsifier, an initiator, a grafting agent, a crosslinking agent, an electrolyte, and a solvent and emulsion-polymerizing the mixture. In this case, grafting efficiency may be improved, and thus physical properties such as impact resistance may be excellent.

In this description, the acrylate-based monomer is defined as including acrylate and a compound in which one or more hydrogens contained therein are substituted with an alkyl group or a halogen.

The acrylate-based monomer is preferably an alkyl acrylate-based monomer. For example, the alkyl acrylate-based monomer may be an acrylic compound, a methacrylic compound, or a mixture thereof, in which an alkyl group having 1 to 10 carbon atoms is substituted. As a specific example, the acrylate-based monomer may include one or more selected from the group consisting of methyl acrylate, ethyl acrylate, propyl acrylate, butyl acrylate, 2-ethylhexyl acrylate, methyl methacrylate, ethyl methacrylate, propyl methacrylate, and butyl methacrylate. In this case, impact resistance and weather resistance may be improved.

For example, the emulsifier may be a fatty acid metal salt having 12 to 20 carbon atoms, a rosin acid metal salt having 12 to 20 carbon atoms, or a mixture thereof. For example, the fatty acid metal salt having 12 to 20 carbon atoms may include one or more selected from fatty acid sodium, sodium laurate, sodium oleate, and potassium oleate, and the rosin acid metal salt having 12 to 20 carbon atoms may be sodium rosinate, potassium rosinate, or a mixture thereof.

For example, based on 100 parts by weight of the acrylate-based monomer, the emulsifier may be included in an amount of 1 to 4 parts by weight, preferably 1.5 to 3 parts by weight. Within this range, components constituting acrylate-based rubber may be easily mixed, thereby obtaining the desired effects of the present invention.

For example, the initiator may be an inorganic peroxide, an organic peroxide, or a mixture thereof. As a specific example, the initiator may be a water-soluble initiator such as potassium persulfate, sodium persulfate, or ammonium persulfate or a fat-soluble initiator such as cumene hydroperoxide or benzoyl peroxide. In this case, polymerization may be easily performed, thereby obtaining the desired effects of the present invention.

For example, based on 100 parts by weight of the acrylate-based monomer, the initiator may be included in an amount of 0.05 to 1 part by weight, preferably 0.1 to 0.5 parts by weight. Within this range, polymerization may be easily performed, thereby obtaining the desired effects of the present invention.

For example, the crosslinking agent may include one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylol methane triacrylate. In this case, the elasticity of acrylate-based rubber may be further increased, and mechanical properties such as impact strength and tensile strength may be improved.

For example, based on 100 parts by weight of the acrylate-based monomer, the crosslinking agent may be included in an amount of 0.02 to 0.3 parts by weight. Within this range, the elasticity of acrylate-based rubber may be further increased, and mechanical properties such as impact strength and tensile strength may be improved.

For example, the electrolyte may include one or more selected from the group consisting of sodium bicarbonate ($NaHCO_3$), sodium pyrosulfate ($Na_2S_2O_7$), and potassium carbonate ($K_2CO_3$).

For example, based on 100 parts by weight of the acrylate-based monomer, the electrolyte may be included in an amount of 0.01 to 0.5 parts by weight.

For example, the acrylate-based rubber may further include a molecular weight modifier. For example, the molecular weight modifier may be t-dodecyl mercaptan, n-octyl mercaptan, or a mixture thereof. In this case, the weight average molecular weight of the acrylate-based rubber may be appropriately adjusted, thereby improving the impact resistance and weather resistance of a composition.

For example, based on 100 parts by weight of the acrylate-based monomer, the molecular weight modifier may be included in an amount of 0.01 to 1 part by weight, preferably 0.01 to 0.3 parts by weight. Within this range, impact resistance and weather resistance may be improved.

For example, immediately after polymerization, the graft copolymer (C) in a latex form may have a pH of 5 to 9, preferably 6 to 8. Within this range, mechanical properties, such as impact resistance, and blow moldability may be excellent, and a wide range of molding temperatures may be secured.

In this description, unless specified otherwise, pH may be measured at room temperature (20 to 25° C.) using a general pH measuring device, as a specific example, a Thermo Scientific Orion Star A Series pH meter.

For example, based on a total weight of the graft copolymer (C), the aromatic vinyl compound included in the graft copolymer (C) may be included in an amount of 10 to 50% by weight, preferably 20 to 45% by weight, more preferably 25 to 40% by weight. Within this range, blow moldability may be excellent, and a wide range of molding temperatures may be secured.

For example, based on a total weight of the graft copolymer (C), the vinyl cyanide compound included in the graft copolymer (C) may be included in an amount of 5 to 30% by weight, preferably 5 to 25% by weight, more preferably 10 to 20% by weight. Within this range, blow moldability may be excellent, and a wide range of molding temperatures may be secured.

(D) Vinyl Cyanide Compound-Aromatic Vinyl Compound Copolymer Having Weight Average Molecular Weight of 1,000,000 to 2,500,000 g/mol For example, based on a total weight of the base resin, the copolymer (D) may be included in an amount of 3.5 to 9% by weight, preferably 4 to 8.5% by weight, more preferably 4 to 8% by weight. Within this range, since parison sag does not occur at high temperature, blow moldability may be excellent. In addition, a wide range of molding temperatures may be secured, and surface quality may be excellent.

The copolymer (D) preferably has a weight average molecular weight of 1,200,000 to 2,300,000 g/mol, more preferably 1,500,000 to 2,000,000 g/mol. Within this range, blow moldability may be excellent, and a wide range of molding temperatures may be secured.

For example, the copolymer (D) may include 10 to 40% by weight of a vinyl cyanide compound and 60 to 90% by weight of an aromatic vinyl compound, preferably 15 to 35% by weight of a vinyl cyanide compound and 65 to 85% by weight of an aromatic vinyl compound, more preferably 20 to 30% by weight of a vinyl cyanide compound and 70 to 80% by weight of an aromatic vinyl compound. In this case, blow moldability may be excellent, and a wide range of molding temperatures may be secured.

(E) Branched Vinyl Cyanide Compound-Aromatic Vinyl Compound Copolymer Having Weight Average Molecular Weight of 300,000 to 800,000 g/mol For example, based on a total weight of the base resin, the branched vinyl cyanide compound-aromatic vinyl compound copolymer (E) may be included in an amount of 1 to 20% by weight, preferably 1 to 17% by weight, more preferably 2 to 15% by weight, still more preferably 2 to 10% by weight. Within this range, occurrence of parison sag may be prevented, and rigidity and heat resistance may be excellent.

The branched vinyl cyanide compound-aromatic vinyl compound copolymer (E) may be prepared by modifying an unbranched linear vinyl cyanide compound-aromatic vinyl compound copolymer into a branched form or by copolymerizing a vinyl cyanide compound and an aromatic vinyl compound copolymer using a polyfunctional initiator.

For example, the branched vinyl cyanide compound-aromatic vinyl compound copolymer (E) may have a polydispersity index (PDI) of 3.5 to 6, preferably 4 to 5.5. Within this range, occurrence of parison sag may be prevented, and rigidity and heat resistance may be excellent.

In this description, the polydispersity index (PDI) means a ratio (Mw/Mn) of a weight average molecular weight (Mw) to a number average molecular weight (Mn). As a polydispersity index (PDI) value decreases, the distribution of molecular weight becomes uniform.

In this description, number average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specifically, the weight average molecular weight is a weight average molecular weight (Mw) converted based on polystyrene by gel permeation chromatography (GPC, PL GPC220, Agilent Technologies). More specifically, number average molecular weight is measured by gel permeation chromatography (GPC, Waters 2410 RI Detector, 515 HPLC pump, 717 Auto Sampler). 0.02 g of each polymer is dissolved in 20 ml of tetrahydrofuran (THF), filtered using a 0.45 μm filter, and placed in a GPC vial (4 ml) to prepare each sample. From 1 hour before start of measurement, the solvent (THF) is injected at a rate of 1.0 mL/min, and measurement is performed under conditions of a measurement time of 25 minutes, an injection volume of 150 μL, a flow rate of 1.0 ml/min, an isocratic pump mode, and an RI detector of 40. At this time, calibration may be performed using a polystyrene standard (PS), and data processing may be performed using ChemStation.

The branched vinyl cyanide compound-aromatic vinyl compound copolymer (E) has excellent elongation properties, thereby improving blow moldability.

For example, the branched vinyl cyanide compound-aromatic vinyl compound copolymer (E) may include 10 to 40% by weight of a vinyl cyanide compound and 60 to 90% by weight of an aromatic vinyl compound, preferably 20 to 30% by weight of a vinyl cyanide compound and 70 to 80% by weight of an aromatic vinyl compound. Within this range, occurrence of parison sag may be prevented, and rigidity and heat resistance may be excellent.

The branched vinyl cyanide compound-aromatic vinyl compound copolymer (E) preferably has a weight average molecular weight of 400,000 to 750,000 g/mol, more preferably 500,000 to 700,000 g/mol. Within this range, mechanical properties may be excellent.

(F) High-Density Polyethylene Resin

For example, based on 100 parts by weight of the base resin, the high-density polyethylene resin (F) may be included in an amount of 0.1 to 2.5 parts by weight, preferably 0.5 to 2 parts by weight, more preferably 0.7 to 1.5 parts by weight. Within this range, surface quality may be excellent, and occurrence of parison sag may be prevented. Thus, blow moldability may be excellent, and a wide range of molding temperatures may be secured.

For example, the high-density polyethylene resin (F) may have a density of 0.9 to 1.5 g/cm$^3$, preferably 0.93 to 1.4 g/cm$^3$, more preferably 0.95 to 1.3 g/cm$^3$, still more preferably 0.97 to 1.2 g/cm$^3$ as measured according to ASTM D1505. Within this range, moldability, workability, and molding cycle may be improved.

For example, the high-density polyethylene resin (F) may have a weight average molecular weight of 1,000 to 6,500 g/mol, preferably 1,500 to 5,500 g/mol. Within this range, moldability, workability, and molding cycle may be improved.

(G) Aromatic Vinyl Compound-Maleimide Compound Copolymer

For example, based on a total weight of the graft copolymer (A), the copolymer (B), the graft copolymer (C), the copolymer (D), the copolymer (E), and the aromatic vinyl compound-maleimide compound copolymer (G), the copolymer (G) may be included in an amount of 5 to 25% by weight, preferably 10 to 20% by weight. Within this range, blow moldability may be excellent, and a wide range of molding temperatures may be secured.

For example, the aromatic vinyl compound-maleimide compound copolymer (G) may be a copolymer including an aromatic vinyl compound and a maleimide compound, preferably a modified aromatic vinyl compound-maleimide compound copolymer including an aromatic vinyl compound, a maleimide compound, and an unsaturated dicarboxylic acid anhydride. In this case, blow moldability may be excellent, and a wide range of molding temperatures may be secured.

For example, the unsaturated dicarboxylic acid anhydride may include one or more selected from the group consisting of maleic anhydride, methyl maleic anhydride, 1,2-dimethylmaleic anhydride, ethylmaleic anhydride, and phenylmaleic anhydride, preferably maleic anhydride.

As a specific example, the aromatic vinyl compound-maleimide compound copolymer may include 30 to 60% by weight of an aromatic vinyl compound, 30 to 70% by weight of a maleimide compound, and 0 to 10% by weight of maleic anhydride. Within this range, a resin composition may have excellent heat resistance, mechanical strength, such as impact strength, and melt flow index.

As a preferred example, the aromatic vinyl compound-maleimide compound copolymer may include 40 to 55% by weight of an aromatic vinyl compound, 40 to 60% by weight of a maleimide compound, and greater than 0% by weight and less than or equal to 8% by weight of maleic anhydride. Within this range, heat resistance, processability, and physical properties such as impact resistance may be excellent.

As a more preferred example, the aromatic vinyl compound-maleimide compound copolymer may include 43 to 51% by weight of an aromatic vinyl compound, 48 to 55% by weight of a maleimide compound, and 0.5 to 5% by weight of maleic anhydride. Within this range, a finally-prepared resin composition may have excellent heat resistance, impact resistance, and processability.

In this description, the maleimide compound may include one or more selected from the group consisting of N-phenyl maleimide, N-methyl maleimide, N-ethyl maleimide, N-butyl maleimide, and N-cyclohexyl maleimide, preferably N-phenyl maleimide.

For example, the aromatic vinyl compound-maleimide compound copolymer (G) may have a glass transition temperature of 180° C. or higher, preferably 180 to 220° C., more preferably 190 to 220° C. Within this range, the heat distortion temperature of a finally-prepared resin composition may be increased, and the finally-prepared resin composition may have excellent heat resistance and processability.

In this description, glass transition temperature (Tg) may be measured using a differential scanning calorimeter (DSC), as a specific example, a differential scanning calorimeter from TA Instruments Co.

For example, the aromatic vinyl compound-maleimide compound copolymer (G) may have a weight average molecular weight of 80,000 to 200,000 g/mol, preferably 100,000 to 170,000 g/mol, more preferably 110,000 to 150,000 g/mol. Within this range, a resin composition may have excellent mechanical properties, such as impact strength, and heat resistance.

As a preferred example, the aromatic vinyl compound-maleimide compound copolymer (G) may be a styrene-(N-phenylmaleimide)-maleic anhydride copolymer. In this case, a resin composition may have excellent heat resistance, mechanical properties, physical property balance, and processability.

(H) α-Methyl Styrene-Based Compound-Vinyl Cyanide Compound Copolymer

For example, based on a total weight of the graft copolymer (A), the copolymer (B), the graft copolymer (C), the copolymer (D), the copolymer (E), and the α-methyl styrene-based compound-vinyl cyanide compound copolymer (H), the copolymer (H) may be included in an amount of 5 to 30% by weight, preferably 5 to 25% by weight, more preferably 10 to 22% by weight. Within this range, blow moldability may be excellent, and a wide range of molding temperatures may be secured.

For example, the α-methyl styrene-based compound-vinyl cyanide compound copolymer (H) may be a copolymer of an α-methylstyrene-based monomer and a vinyl cyanide compound; or a copolymer of an α-methylstyrene-based monomer, a vinyl cyanide compound, and an aromatic vinyl compound excluding α-methylstyrene, preferably a copolymer of α-methylstyrene, acrylonitrile, and styrene.

Specifically, the α-methyl styrene-based compound-vinyl cyanide compound copolymer (H) may be a copolymer including 50 to 80% by weight of an α-methylstyrene-based monomer, 20 to 50% by weight of a vinyl cyanide compound, and 0 to 10% by weight of an aromatic vinyl compound excluding α-methylstyrene. In this case, heat resistance and blow moldability may be excellent while maintaining impact strength.

The α-methyl styrene-based compound-vinyl cyanide compound copolymer (H) is preferably a copolymer including 70 to 80% by weight of α-methylstyrene, 20 to 30% by weight of acrylonitrile, and 0 to 8% by weight of styrene. In this case, heat resistance and blow moldability may be excellent while maintaining impact strength.

In this description, "0 to 10% by weight of styrene" may mean "0% by weight of styrene" or "greater than 0% by weight and less than or equal to 10% by weight of styrene".

For example, the α-methyl styrene-based monomer may include one or more selected from the group consisting of α-methyl styrene and a derivative thereof. In this case, heat resistance may be excellent. The derivative of α-methyl styrene is preferably a compound in which one or more hydrogens thereof are substituted with a substituent such as an alkyl group or a halogen group having 1 to 10 carbon atoms, more preferably a compound in which one or more hydrogens in an aromatic ring thereof are substituted with a substituent such as an alkyl group or a halogen group having 1 to 10 carbon atoms.

For example, the α-methyl styrene-based compound-vinyl cyanide compound copolymer (H) may have a weight average molecular weight of 60,000 to 180,000 g/mol, preferably 80,000 to 120,000 g/mol. Within this range, heat resistance may be excellent while maintaining impact strength.

Thermoplastic Resin Composition

For example, when melt indexes are measured at 220° C. and 240° C. according to ISO 1133, respectively, the thermoplastic resin composition may have a melt index ratio of a melt index at 240° C. to a melt index at 220° C. (melt index at 240° C./melt index at 220° C.) of 4.5 or less, preferably 4 or less. Within this range, physical property balance and blow moldability may be excellent, and a molding temperature range may be widened.

For example, the thermoplastic resin composition may have a parison sag of 40 seconds or more, preferably 50 seconds or more, more preferably 60 seconds or more, still more preferably 60 to 120 seconds, most preferably 60 to 100 seconds, measured as time taken to extend a parison having a length of 500 mm, a thickness of 0.5 mm, and a weight of 500 g by 1% or more based on an entire length of the parison while discharging the parison from a blow molding machine at a barrel temperature of 220° C. Within this range, blow moldability may be excellent.

In this description, parison sag is measured as time taken to extend a parison having a length of 500 mm, a thickness of 0.5 mm, and a weight of 500 g by 1% or more based on an entire length of the parison while discharging the parison from a blow molding machine at a barrel temperature of 220° C. At this time, images of the discharged parison are captured using a camera, and parison sag is analyzed using the images.

For example, the thermoplastic resin composition may have a parison sag of 40 seconds or more, preferably 50 seconds or more, more preferably 60 seconds or more, still more preferably 60 to 120 seconds, most preferably 60 to 100 seconds, measured as time taken to extend a parison having a length of 500 mm, a thickness of 0.5 mm, and a weight of 500 g by 1% or more based on an entire length of the parison while discharging the parison from a blow molding machine at a barrel temperature of 240° C. Within this range, blow moldability may be excellent.

For example, when it is visually observed whether melt-fractures have occurred on the surface of an injection-molded specimen having a size of 40×80 mm, the thermoplastic resin composition may have no melt-fractures. In this case, surface quality may be excellent.

For example, the thermoplastic resin composition may have a heat deflection temperature of 89° C. or higher, preferably 90 to 100° C. as measured using a specimen having a thickness of 4 mm under a load of 1.8 MPa according to ISO 075. Within this range, physical property balance may be excellent.

For example, the thermoplastic resin composition may have a Charpy impact strength of 17 kJ/m$^2$ or more, preferably 17 to 27 kJ/m$^2$ as measured at 23° C. according to ISO 179. Within this range, physical property balance may be excellent.

For example, the thermoplastic resin composition may have a melt index of 0.6 g/10 min or more, preferably 0.6 to 1.5 g/10 min as measured at 220° C. and 10 kg/cm$^3$ according to ISO 1133. Within this range, physical property balance and moldability may be excellent.

For example, the thermoplastic resin composition may have a tensile strength of 37 MPa or more, preferably 37 to 47 MPa, more preferably 37 to 43 MPa as measured using a specimen having a thickness of 2 mm under conditions of 200 mm/min according to ISO 527. Within this range, physical property balance may be excellent.

For example, the thermoplastic resin composition may include one or more selected from the group consisting of an antioxidant, a lubricant, and a molding aid. In this case, required physical properties may be effectively expressed without deterioration in the intrinsic properties of the thermoplastic resin composition of the present invention.

For example, the antioxidant may be a hindered phenolic antioxidant, a phosphite antioxidant, or a mixture thereof. In this case, light resistance and weather resistance may be improved.

For example, the hindered phenolic antioxidant may include one or more selected from the group consisting of 4,4'-methylene-bis(2,6-di-t-butylphenol), octadecyl-3-(3,5-di-t-butyl-4-hydroxyphenyl)propionate, pentaerythritol tetrakis[3-(3,5-di-t-butyl-4-hydroxyphenyl)propionate], and 3,9-bis[2-[3-(3-tert-butyl-4-hydroxy-5-methylphenyl)propionyloxy]-1,1-dimethylethyl]-2,4,8,10-tetraoxaspiro[5.5] undecane, preferably pentaerythritol tetrakis[3-(3,5-di-t-butyl-4-hydroxyphenyl)propionate].

For example, based on 100 parts by weight of the thermoplastic resin composition including (A) to (H), the hindered phenolic antioxidant may be included in an amount of 0.1 to 2 parts by weight, preferably 0.3 to 1.5 parts by weight, more preferably 0.3 to 1 part by weight. Within this range, heat aging resistance may be improved.

For example, the phosphite antioxidant may include one or more selected from the group consisting of tris-(2,4-di-t-butyl phenyl)phosphite, bis-(2,4-di-t-butyl phenyl)pentaerythritol-diphosphite, bis-(2,6-di-t-butyl-4-methylphenyl)pentaerythritol-diphosphite, distearyl-pentaerythritol-diphosphite, [bis(2,4-di-t-butyl-5-methylphenoxy)phosphino]biphenyl, and N,N-bis[2-[[2,4,8,10-tetrakis(1,1-dimethylethyl)dibenzo[d,f][1,3,2]dioxyphospepin-6-yl]oxy]-ethyl]ethanamine, preferably bis-(2,6-di-t-butyl-4-methylphenyl)pentaerythritol-diphosphite.

For example, based on 100 parts by weight of the thermoplastic resin composition including (A) to (H), the phosphite antioxidant may be included in an amount of 0.1 to 2 parts by weight, preferably 0.3 to 1.5 parts by weight, more preferably 0.3 to 1 part by weight. Within this range, heat aging resistance may be improved.

For example, the lubricant may include one or more selected from the group consisting of an ester-based lubricant, a metal salt-based lubricant, a carboxylic acid-based lubricant, a hydrocarbon-based lubricant, and an amide-based lubricant, preferably a metal salt-based lubricant, an amide-based lubricant, or a mixture thereof. In this case, the intrinsic effects of a lubricant may be efficiently expressed without reducing the mechanical properties and thermal stability of a resin.

The amide-based lubricant is preferably a stearamide-based lubricant, more preferably alkylene bis(stearamide) containing an alkylene having 1 to 10 carbon atoms, most preferably ethylene bis stearamide. In this case, the intrinsic effects of a lubricant may be efficiently expressed without reducing the mechanical properties and thermal stability of a resin.

For example, based on 100 parts by weight of the thermoplastic resin composition including (A) to (H), the amide-based lubricant may be included in an amount of 0.05 to 2 parts by weight, preferably 0.1 to 1.5 parts by weight, more preferably 0.2 to 1 part by weight. Within this range, the intrinsic effects of a lubricant may be efficiently expressed without reducing the mechanical properties and thermal stability of a resin.

The metal salt-based lubricant is preferably a stearic acid-based metal salt-based lubricant. More preferably, the metal salt-based lubricant includes one or more selected from the group consisting of calcium stearate, magnesium stearate, aluminum stearate, potassium stearate, and barium stearate, most preferably calcium stearate. In this case, the intrinsic effects of a lubricant may be efficiently expressed without reducing the mechanical properties and thermal stability of a resin.

For example, based on 100 parts by weight of the thermoplastic resin composition consisting of (A) to (H), the metal salt-based lubricant may be included in an amount of 0.05 to 2 parts by weight, preferably 0.1 to 1.5 parts by weight, more preferably 0.2 to 1 part by weight. Within this range, the intrinsic effects of a lubricant may be efficiently expressed without reducing the mechanical properties and thermal stability of a resin.

For example, the molding aid may include one or more selected from the group consisting of polytetrafluoroethylene, polyvinylidene fluoride, a hexafluoroethylene/tetrafluoroethylene copolymer, and a tetrafluoroethylene/ethylene copolymer, preferably polytetrafluoroethylene. In this case, moldability may be further improved.

For example, based on 100 parts by weight of the thermoplastic resin composition consisting of (A) to (H), the molding aid may be included in an amount of 0.01 to 2 parts by weight, preferably 0.05 to 1 part by weight. Within this range, moldability may be further improved.

When necessary, based on 100 parts by weight of the thermoplastic resin composition consisting of (A) to (H), the thermoplastic resin composition may further include 0.01 to 5 parts by weight, preferably 0.05 to 3 parts by weight, more preferably 0.1 to 2 parts by weight, still more preferably 0.5 to 1 part by weight of each of one or more selected from the group consisting of a flame retardant, a hydrolysis stabilizer, a dye, a pigment, a colorant, an antistatic agent, a crosslinking agent, an antibacterial agent, a processing aid, and a carbon black masterbatch.

Within this range, required physical properties may be effectively expressed without deterioration in the intrinsic properties of the thermoplastic resin composition of the present invention.

Method of Preparing Thermoplastic Resin Composition

A method of preparing a thermoplastic resin composition according to the present invention includes a step of preparing pellets by kneading and extruding, under conditions of 200 to 300° C. and 200 to 300 rpm, 100 parts by weight of a base resin including 10 to 50% by weight of a vinyl cyanide compound-conjugated diene compound-aromatic vinyl compound graft copolymer (A); 10 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 1 to 20% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm$^3$ and a weight average molecular weight of 1,000 to 6,500 g/mol. In this case, blow moldability may be excellent, and a wide range of molding temperatures may be secured.

For example, the kneading and extrusion may be performed using a single-screw extruder, a twin-screw extruder, or a Banbury mixer. In this case, a composition may be uniformly dispersed, and thus compatibility may be excellent.

For example, the kneading and extrusion may be performed at a barrel temperature of 200 to 300° C., preferably 210 to 290° C., more preferably 210 to 280° C., still more preferably 220 to 250° C. In this case, throughput per unit time may be appropriate, and melt-kneading may be sufficiently performed. In addition, thermal decomposition of a resin component may be prevented.

For example, the kneading and extrusion may be performed at a screw rotation rate of 200 to 300 rpm, preferably 220 to 280 rpm, more preferably 230 to 270 rpm. In this case, throughput per unit time may be appropriate, and thus process efficiency may be excellent. In addition, excessive cutting may be prevented.

The method of preparing the thermoplastic resin composition shares all the technical characteristics of the above-described thermoplastic resin composition. Accordingly, repeated description thereof will be omitted.

Molded Article

A molded article of the present invention may include the thermoplastic resin composition of the present invention. In this case, heat aging resistance may be excellent.

For example, the molded article may be a molded article for vehicles. Specifically, the molded article may be a spoiler for vehicles, a trunk garnish, or a bumper guard. In this case, by using the thermoplastic resin composition of the present invention, a high-quality product with quality higher than that required by the market may be provided.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Examples (A) ABS graft copolymer: DP280 manufactured by LG Chemical Co.
(B) ABS copolymer: ER400 as a bulk-polymerized ABS copolymer manufactured by LG Chemical Co.
(C-1) ASA graft copolymer: SA927 (graft ratio: 40 to 55%, weight average molecular weight: 150,000 to 200,000 g/mol) manufactured by LG Chemical Co.
(C-2) ASA graft copolymer: SA130 (graft ratio: 35 to 44%, weight average molecular weight: 80,000 to 100,000 g/mol) manufactured by LG Chemical Co.
(C-3) ASA graft copolymer: SA928 (graft ratio: 20 to 39%, weight average molecular weight: 130,000 to 160,000 g/mol) manufactured by LG Chemical Co.
(C-4) ASA graft copolymer: SA100 (graft ratio: 15 to 30%, weight average molecular weight: 100,000 to 120,000 g/mol) manufactured by LG Chemical Co.
(D) High molecular weight SAN: ZB869 (weight average molecular weight: 1,500,000 to 2,000,000 g/mol, acrylonitrile: 25% by weight, and styrene: 75% by weight) manufactured by ZIBO HUAXING Co.
(E) Branched SAN: EMI-230B (polydispersity index: 4.2, acrylonitrile: 25% by weight, and styrene: 75% by weight) manufactured by Fine-blend Co.
(F) High-density polyethylene resin (HDPE): HI-WAX 400P (density: 0.98 g/cm$^3$, weight average molecular weight: 1,500 to 5,500 g/mol) manufactured by Mitsui Co.
(G) Aromatic vinyl compound-maleimide compound copolymer (PMI-PS): MSBB (PMI: 52% by weight, styrene: 46% by weight, MAH: 2% by weight; weight average molecular weight: 120,000 g/mol) manufactured by Denka Co.
(H) α-methyl styrene-based compound-vinyl cyanide compound copolymer (AMSAN): 99UH (acrylonitrile: 28% by weight, α-methyl styrene: 72% by weight; weight average molecular weight: 100,000 g/mol) manufactured by LG Chemical Co.
Hindered phenolic antioxidant: IR1010 manufactured by BASF Co.
Phosphite antioxidant: PEP-36 manufactured by ADEKA Co.
Lubricant: EBA (Yuji Co., Japan)
Molding aid: XFlon-G manufactured by POCERA Co.

Examples 1 to 6 and Comparative Examples 1 to 11

According to the contents shown in Tables 1 to 3 below, the components shown in Tables 1 to 3 were fed into an extruder (SM twin-screw extruder, 250), and kneading and extrusion were performed under conditions of an extrusion temperature of 230° C., a feed rate of 90 kg/hr, and a screw rotation rate of 250 rpm to prepare pellets. Using the prepared pellets, melt index was measured. In addition, the prepared pellets were injected under conditions of an injection temperature of 250° C., a mold temperature of 60° C., and an injection speed of 30 mm/min using an injection machine (ENGEL 120MT) to prepare an injection specimen.

Test Examples

The properties of the pellets and the injection specimens prepared in Examples 1 to 6 and Comparative Examples 1 to 11 were measured according to the following methods, and the results are shown in Tables 1 to 3 below.

Melt index (MI): Melt index was measured under conditions of 220° C. and 10 kg/cm$^3$ according to ISO 1133. Here, the unit of melt index is g/10 min.

Melt index ratio: Melt indexes were measured at 220° C. and 240° C. according to ISO 1133, respectively. The melt index ratio of the melt index measured at 240° C. to the melt index measured at 220° C. (melt index at 240° C./melt index at 220° C.) was calculated, and the melt index ratio was evaluated based on the following criteria.

High: Melt index ratio of 4 or less

Medium: Melt index ratio of greater than 4 and less than or equal to 4.5

Low: Melt index ratio of greater than 4.5

Parison sag: At barrel temperatures of 220° C. and 240° C., respectively, in a blow molding machine, time taken to extend a parison having a length of 500 mm, a thickness of 0.5 mm, and a weight of 500 g by 1% or more based on an entire length of the parison while discharging the parison was measured, and parison sag was evaluated based on the following criteria.

High: 60 seconds or more

Medium: Greater than or equal to 40 seconds and less than 60 seconds

Low: Less than 40 seconds

Surface properties: The presence or absence of melt-fractures on the surface of a specimen having a size of 40×80 mm was observed, and surface properties were evaluated based on the following criteria.

High: No melt-fractures

Low: One or more melt-fractures

Charpy impact strength (kJ/m$^2$): Charpy impact strength was measured at 23° C. according to ISO 179.

Tensile strength (MPa): Tensile strength was measured at a rate of 200 mm/min using a specimen having a thickness of 2 mm according to ISO 527.

Heat distortion temperature (° C.): Heat distortion temperature was measured under a load of 1.8 MPa using a specimen having a thickness of 4 mm according to ISO 075.

TABLE 1

| Classification | Example 1 | Example 2 | Example 3 | Example 4 | Example 5 | Example 6 |
|---|---|---|---|---|---|---|
| (A) ABS graft copolymer | 22 | 22 | 22 | 22 | 22 | 22 |
| (B) ABS copolymer | 28 | 28 | 28 | 28 | 28 | 28 |
| (C-1) ASA graft copolymer | 5 | 8 | 10 | 8 | 8 | 10 |
| (C-2) ASA graft copolymer | | | | | | |
| (C-3) ASA graft copolymer | | | | | | |
| (C-4) ASA graft copolymer | | | | | | |
| (D) High molecular weight SAN | 7 | 7 | 7 | 4 | 8 | 7 |
| (E) Branched SAN | 5 | 5 | 5 | 5 | 5 | 5 |
| (G) PMI-PS | 15 | 15 | 15 | 15 | 15 | 15 |
| (H) AMSAN | 18 | 15 | 13 | 18 | 14 | 13 |
| (F) HDPE (parts by weight) | 1 | 1 | 1 | 1 | 1 | 1.5 |
| IR1010 (parts by weight) | 0.3 | 0.3 | 0.3 | 0.3 | 0.3 | 0.3 |
| PEP-36 (parts by weight) | 0.3 | 0.3 | 0.3 | 0.3 | 0.3 | 0.3 |
| EBA (parts by weight) | 0.2 | 0.2 | 0.2 | 0.2 | 0.2 | 0.2 |
| LPCA (parts by weight) | 0.5 | 0.5 | 0.5 | 0.5 | 0.5 | 0.5 |
| XFlon-G (parts by weight) | 0.15 | 0.15 | 0.15 | 0.15 | 0.15 | 0.15 |
| Physical properties | | | | | | |
| Charpy impact strength | 19 | 20 | 21 | 20 | 20 | 21 |
| Melt index (MI) | 0.9 | 0.7 | 0.6 | 1.5 | 0.6 | 0.7 |
| Tensile strength | 40 | 39 | 38 | 39 | 39 | 39 |
| Heat distortion temperature | 92 | 92 | 91 | 93 | 92 | 92 |
| Melt index ratio | Medium | High | High | Medium | High | High |
| Parison sag (220° C.) | High | High | High | High | High | High |
| Parison sag (240° C.) | Medium | High | High | Medium | High | High |
| Surface properties | High | High | High | High | High | High |

TABLE 2

| Classification | Comparative Example 1 | Comparative Example 2 | Comparative Example 3 | Comparative Example 4 | Comparative Example 5 |
|---|---|---|---|---|---|
| (A) ABS graft copolymer | 22 | 22 | 22 | 22 | 22 |
| (B) ABS copolymer | 28 | 28 | 28 | 28 | 28 |
| (C-1) ASA graft copolymer | 3 | 12 | | | |
| (C-2) ASA graft copolymer | | | 8 | | |

TABLE 2-continued

| Classification | Comparative Example 1 | Comparative Example 2 | Comparative Example 3 | Comparative Example 4 | Comparative Example 5 |
|---|---|---|---|---|---|
| (C-3) ASA graft copolymer | | | | 8 | |
| (C-4) ASA graft copolymer | | | | | 8 |
| (D) High molecular weight SAN | 7 | 7 | 7 | 7 | 7 |
| (E) Branched SAN | 5 | 5 | 5 | 5 | 5 |
| (G) PMI-PS | 15 | 15 | 15 | 15 | 15 |
| (H) AMSAN | 20 | 11 | 15 | 15 | 15 |
| (F) HDPE (parts by weight) | 1 | 1 | 1 | 1 | 1 |
| IR1010 (parts by weight) | 0.3 | 0.3 | 0.3 | 0.3 | 0.3 |
| PEP-36 (parts by weight) | 0.3 | 0.3 | 0.3 | 0.3 | 0.3 |
| EBA (parts by weight) | 0.2 | 0.2 | 0.2 | 0.2 | 0.2 |
| LPCA (parts by weight) | 0.5 | 0.5 | 0.5 | 0.5 | 0.5 |
| XFlon-G (parts by weight) | 0.15 | 0.15 | 0.15 | 0.15 | 0.15 |
| Physical properties | | | | | |
| Charpy impact strength | 18 | 22 | 17 | 19 | 23 |
| Melt index (MI) | 1.1 | 0.6 | 0.9 | 1.2 | 1.2 |
| Tensile strength | 41 | 37 | 42 | 40 | 38 |
| Heat distortion temperature | 93 | 90 | 93 | 93 | 90 |
| Melt index ratio | Low | High | Medium | Medium | Low |
| Parison sag (220° C.) | High | High | Medium | High | Medium |
| Parison sag (240° C.) | Low | High | Low | Low | Low |
| Surface properties | High | Low | High | High | High |

TABLE 3

| Classification | Comparative Example 6 | Comparative Example 7 | Comparative Example 8 | Comparative Example 9 | Comparative Example 10 | Comparative Example 11 |
|---|---|---|---|---|---|---|
| (A) ABS graft copolymer | 22 | 22 | 22 | 22 | 22 | 22 |
| (B) ABS non-graft copolymer | 28 | 28 | 28 | 28 | 28 | 20 |
| (C-1) ASA graft copolymer | 8 | 8 | 8 | 8 | 8 | 8 |
| (C-2) ASA graft copolymer | | | | | | |
| (C-3) ASA graft | | | | | | |

TABLE 3-continued

| Classification | Comparative Example 6 | Comparative Example 7 | Comparative Example 8 | Comparative Example 9 | Comparative Example 10 | Comparative Example 11 |
|---|---|---|---|---|---|---|
| copolymer (C-4) ASA graft copolymer | | | | | | |
| (D) High molecular weight SAN | 3 | 10 | 7 | 7 | 7 | 4 |
| (E) Branched SAN | 5 | 5 | 5 | 5 | 0.5 | 25 |
| (G) PMI-PS | 15 | 15 | 15 | 15 | 15 | 10 |
| (H) AMSAN | 19 | 12 | 15 | 15 | 19.5 | 10 |
| (F) HDPE (parts by weight) | 1 | 1 | 0.05 | 3 | 1 | 1 |
| IR1010 (parts by weight) | 0.3 | 0.3 | 0.3 | 0.3 | 0.3 | 0.3 |
| PEP-36 (parts by weight) | 0.3 | 0.3 | 0.3 | 0.3 | 0.3 | 0.3 |
| EBA (parts by weight) | 0.2 | 0.2 | 0.2 | 0.2 | 0.2 | 0.2 |
| LPCA (parts by weight) | 0.5 | 0.5 | 0.5 | 0.5 | 0.5 | 0.5 |
| XFlon-G (parts by weight) | 0.15 | 0.15 | 0.15 | 0.15 | 0.15 | 0.15 |
| Physical properties | | | | | | |
| Charpy impact strength | 20 | 20 | 20 | 20 | 20 | 18 |
| Melt index (MI) | 1.8 | 0.4 | 0.7 | 0.7 | 0.7 | 1.5 |
| Tensile strength | 40 | 41 | 39 | 39 | 39 | 41 |
| Heat distortion temperature | 92 | 92 | 92 | 92 | 93 | 89 |
| Melt index ratio | Medium | High | High | Medium | High | Medium |
| Parison sag (220° C.) | Medium | High | High | Medium | Low | High |
| Parison sag (240° C.) | Medium | Medium | High | Medium | Low | Medium |
| Surface properties | High | Low | Low | High | High | Low |

(In Tables 1 to 3, the content of each of (A), (B), (C), (D), (E), (G), and (H) is given in % by weight based on a total weight of (A), (B), (C), (D), (E), (G), and (H), and the content of (F) is given in parts by weight based on 100 parts by weight in total of (A), (B), (C), (D), (E), (G), and (H).)

As shown in Tables 1 to 3, compared to Comparative Examples 1 to 11, the thermoplastic resin compositions (Examples 1 to 6) according to the present invention have excellent mechanical properties, such as impact strength and tensile strength. In addition, due to excellent melt index ratio and parison sag, the thermoplastic resin compositions according to the present invention have excellent blow moldability and surface properties, and have a wide range of molding temperatures.

Specifically, in the case of Comparative Examples 1 and 2 including the ASA graft copolymer (C) in an amount outside the range of the present invention, Comparative Example 1 including a small amount of the ASA graft copolymer (C) exhibits poor melt index ratio and parison sag (240° C.), and Comparative Example 2 including an excess of the ASA graft copolymer (C) exhibits poor surface properties.

In addition, in the case of Comparative Examples 3 to 5 including the ASA graft copolymer (C) having a graft ratio and a weight average molecular weight outside the range of the present invention, melt index ratio and parison sag at 220° C., especially the parison sag at 240° C. are deteriorated.

In addition, in the case of Comparative Example 6 including the high molecular weight SAN (D) in an amount less than the range of the present invention, melt index ratio and parison sag (220° C., 240° C.) are poor. In the case of Comparative Example 7 including the high molecular weight SAN (D) in an amount exceeding the range of the present invention, surface properties are poor.

In addition, in the case of Comparative Example 8 including the HDPE (F) in an amount less than the range of the present invention, surface properties are poor. In the case of Comparative Example 9 including the HDPE (F) in an amount exceeding the range of the present invention, melt index ratio and parison sag are deteriorated.

In addition, in the case of Comparative Example 10 including the branched SAN resin (E) in an amount less than the range of the present invention, parison sag (220° C., 240° C.) is poor. In the case of Comparative Example 11 including the branched SAN resin (E) in an amount exceeding the range of the present invention, surface properties are poor.

In conclusion, it can be confirmed that the [206] thermoplastic resin composition prepared by including the ABS graft copolymer and the ABS copolymer according to the present invention, an acrylate-aromatic vinyl compound-vinyl cyanide compound graft copolymer having a graft ratio of 40 to 60% and a weight average molecular weight of 150,000 to 200,000 g/mol, a vinyl cyanide compound-aromatic vinyl compound copolymer having a weight average molecular weight of 1,000,000 to 2,500,000 g/mol, a branched vinyl cyanide compound-aromatic vinyl compound copolymer having a weight average molecular weight of 300,000 to 800,000 g/mol, and a high-density polyethylene resin having a density of 0.9 to 1.5 g/cm$^3$ and a weight average molecular weight of 1,000 to 6,500 g/mol in a predetermined content ratio has excellent blow moldability. In addition, the thermoplastic resin composition is capable of being molded at a wide range of molding temperatures.

The invention claimed is:

1. A thermoplastic resin composition, comprising:
   100 parts by weight of a base resin comprising 15 to 50% by weight of a vinyl cyanide compound-conjugated diene compound-aromatic vinyl compound graft copolymer (A); 20 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 2 to 10% by weight of a branched vinyl cyanide compound-aromatic vinyl compound copolymer (E) having a weight average molecular weight of 300,000 to 800,000 g/mol, and
   0.1 to 2.5 parts by weight of a high-density polyethylene resin (F) having a density of 0.9 to 1.5 g/cm$^3$ and a weight average molecular weight of 1,000 to 6,500 g/mol,
   wherein the graft copolymer (A) has a graft ratio of 32 to 50%.

2. The thermoplastic resin composition according to claim 1, wherein the vinyl cyanide compound-conjugated diene compound-aromatic vinyl compound graft copolymer (A) is a graft copolymer prepared by graft-polymerizing 1 to 25% by weight of a vinyl cyanide compound, 45 to 75% by weight of conjugated diene rubber comprising a conjugated diene compound, and 15 to 45% by weight of an aromatic vinyl compound.

3. The thermoplastic resin composition according to claim 1, wherein the vinyl cyanide compound-conjugated diene compound-aromatic vinyl compound copolymer (B) comprises 5 to 20% by weight of conjugated diene rubber comprising a conjugated diene compound, 55 to 85% by weight of an aromatic vinyl compound, and 5 to 25% by weight of a vinyl cyanide compound.

4. The thermoplastic resin composition according to claim 1, wherein the acrylate-aromatic vinyl compound-vinyl cyanide compound graft copolymer (C) comprises 20 to 60% by weight of acrylate-based rubber having an average particle diameter of 300 to 600 nm, 10 to 50% by weight of an aromatic vinyl compound, and 5 to 30% by weight of a vinyl cyanide compound.

5. The thermoplastic resin composition according to claim 1, wherein the vinyl cyanide compound-aromatic vinyl compound copolymer (D) comprises 10 to 40% by weight of a vinyl cyanide compound and 60 to 90% by weight of an aromatic vinyl compound.

6. The thermoplastic resin composition according to claim 1, wherein the branched vinyl cyanide compound-aromatic vinyl compound copolymer (E) having a weight average molecular weight of 300,000 to 800,000 g/mol has a polydispersity index (PDI) of 3.5 to 6.

7. The thermoplastic resin composition according to claim 1, wherein the base resin comprises 5 to 25% by weight of an aromatic vinyl compound-maleimide compound copolymer (G) based on a total weight of (A), (B), (C), (D), (E), and (G).

8. The thermoplastic resin composition according to claim 1, wherein the base resin comprises 5 to 30% by weight of an α-methyl styrene-based compound-vinyl cyanide compound copolymer (H) based on a total weight of (A), (B), (C), (D), (E), and (H).

9. The thermoplastic resin composition according to claim 1, wherein, when melt indexes are measured at 220° C. and 240° C. according to ISO 1133, respectively, the thermoplastic resin composition has a melt index ratio of a melt index at 240° C. to a melt index at 220° C. of 4.5 or less.

10. The thermoplastic resin composition according to claim 1, wherein the thermoplastic resin composition has a parison sag of 40 seconds or more, measured as time taken to extend a parison having a length of 500 mm, a thickness of 0.5 mm, and a weight of 500 g by 1% or more based on an entire length of the parison while discharging the parison from a blow molding machine at a barrel temperature of 220° C.

11. The thermoplastic resin composition according to claim 1, wherein the thermoplastic resin composition comprises one or more selected from the group consisting of an antioxidant, a lubricant, and a molding aid.

12. A molded article, comprising the thermoplastic resin composition according to claim 1.

13. A method of preparing a thermoplastic resin composition, comprising preparing pellets by kneading and extruding, under conditions of 200 to 300° C. and 200 to 300 rpm, 100 parts by weight of a base resin comprising 15 to 50% by weight of a vinyl cyanide compound-conjugated diene compound-aromatic vinyl compound graft copolymer (A); 20 to 55% by weight of a vinyl cyanide compound-conjugated diene compound-aromatic vinyl compound copolymer (B); 4 to 11% by weight of an acrylate-aromatic vinyl compound-vinyl cyanide compound graft copolymer (C) having a graft ratio of 40 to 60% and a weight average molecular weight of 150,000 to 200,000 g/mol; 3.5 to 9% by weight of a vinyl cyanide compound-aromatic vinyl compound copolymer (D) having a weight average molecular weight of 1,000,000 to 2,500,000 g/mol; and 2 to 10% by weight of a branched vinyl cyanide compound-aromatic vinyl compound copolymer (E) having a weight average molecular weight of 300,000 to 800,000 g/mol and 0.1 to 2.5 parts by weight of a high-density polyethylene resin (F) having a density of 0.9 to 1.5 g/cm$^3$ and a weight average molecular weight of 1,000 to 6,500 g/mol, wherein the graft copolymer (A) has a graft ratio of 32 to 50%.

\* \* \* \* \*